No. 862,846.
PATENTED AUG. 6, 1907.
G. H. REYNOLDS.
DECORTICATING MACHINE.
APPLICATION FILED APR. 2, 1906.
3 SHEETS—SHEET 1.
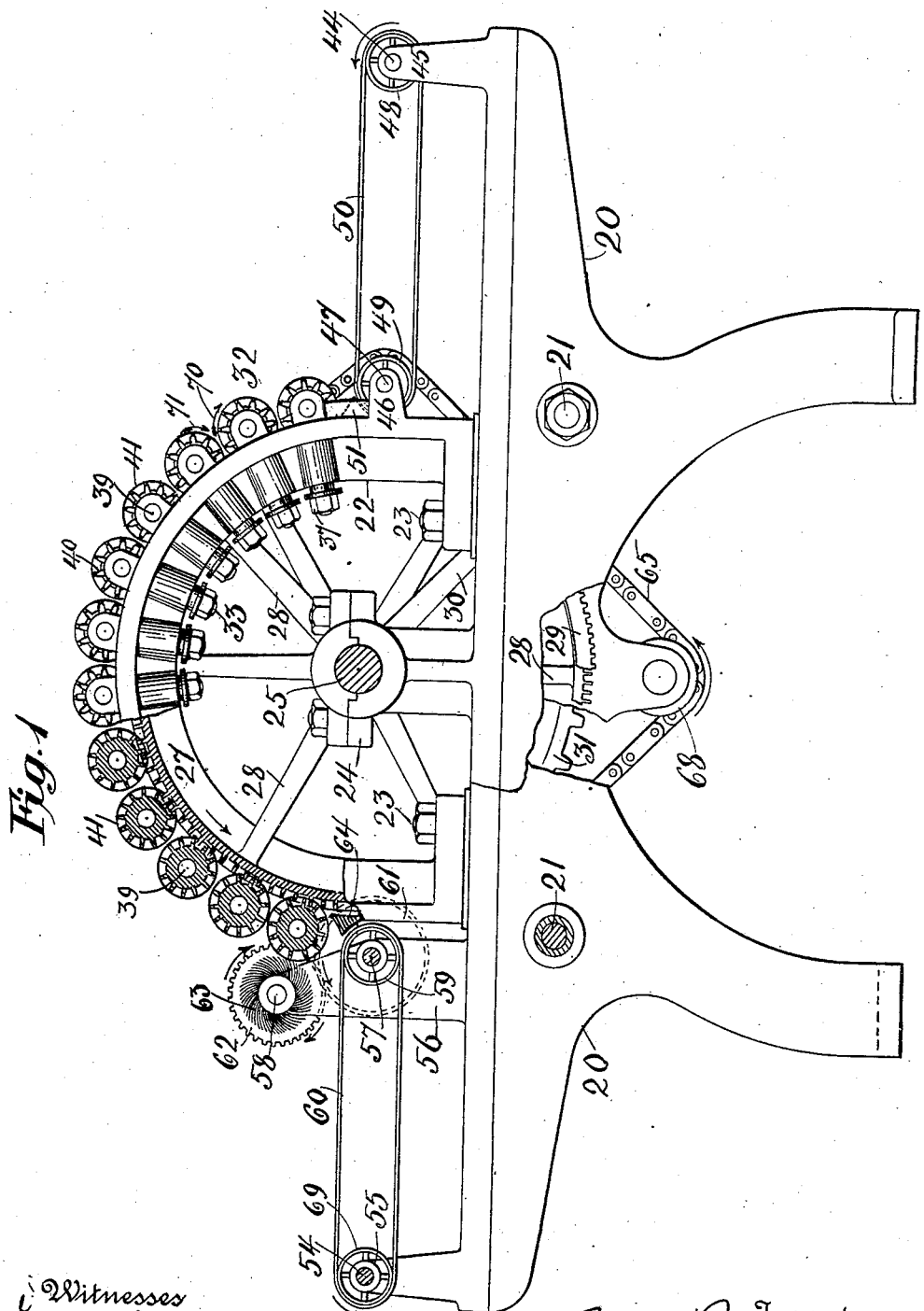

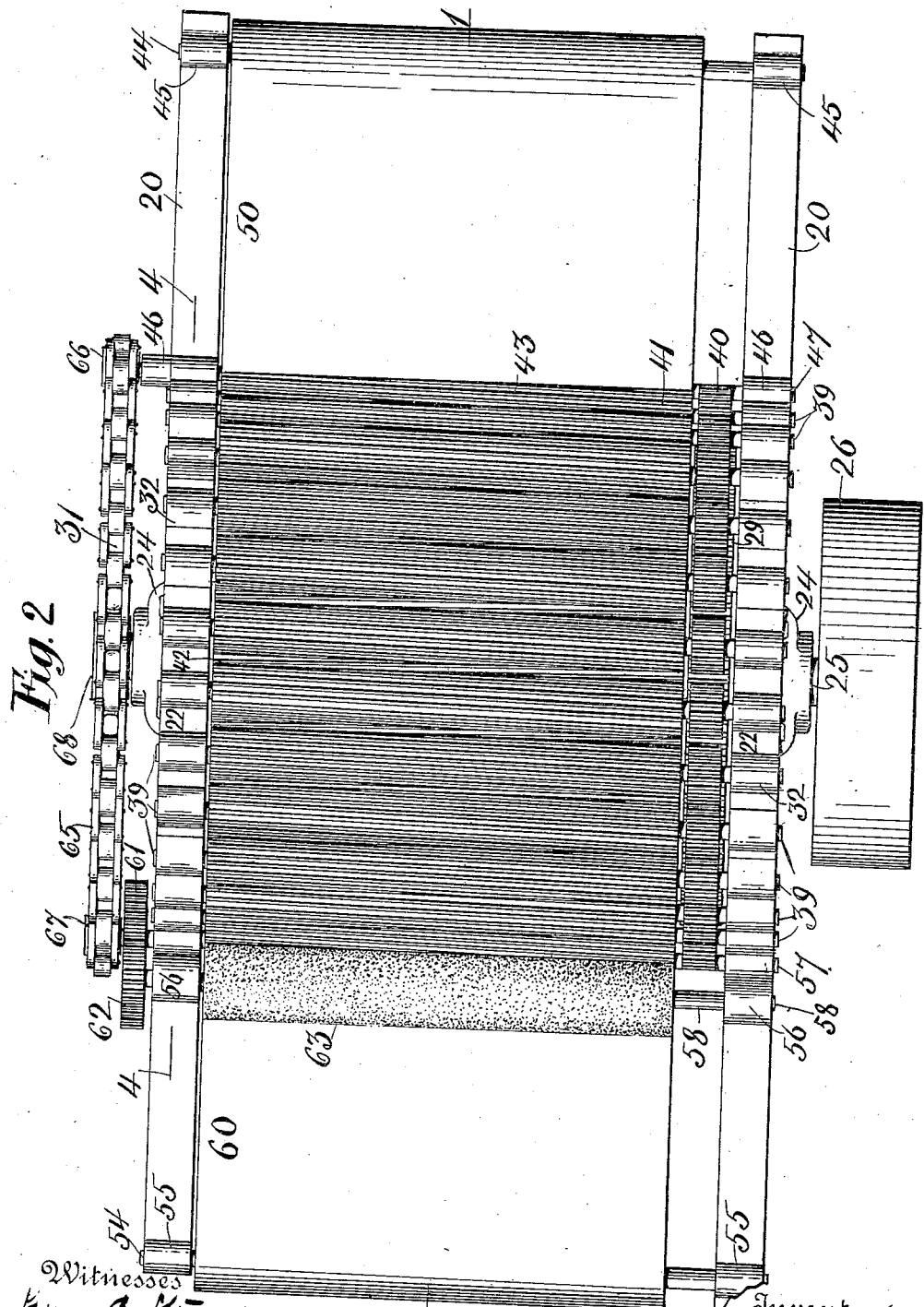

No. 862,846.
PATENTED AUG. 6, 1907.
G. H. REYNOLDS.
DECORTICATING MACHINE.
APPLICATION FILED APR. 2, 1906.
3 SHEETS—SHEET 3.
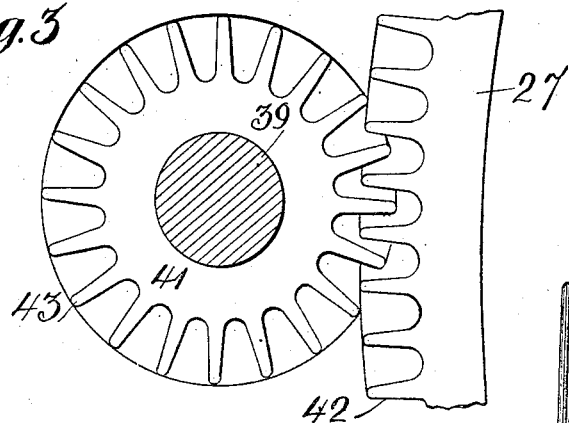
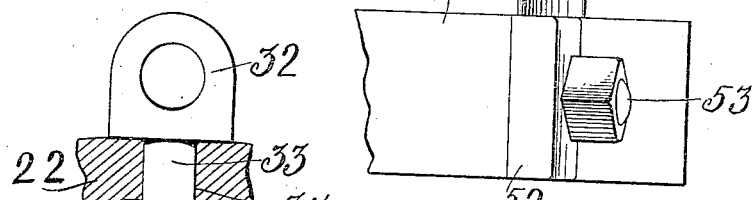
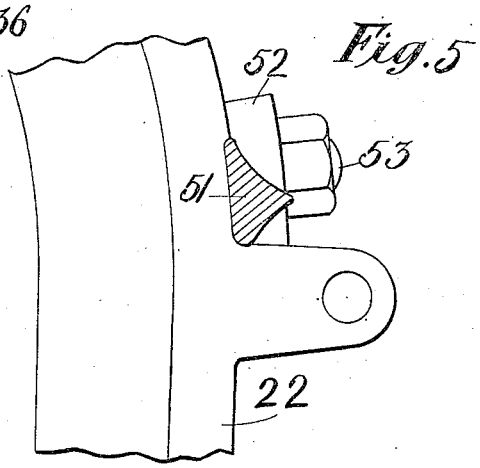

UNITED STATES PATENT OFFICE.

GEORGE H. REYNOLDS, OF MANSFIELD DEPOT, CONNECTICUT.

DECORTICATING-MACHINE.

No. 862,846.　　　　　Specification of Letters Patent.　　　　Patented Aug. 6, 1907.

Application filed April 2, 1906. Serial No. 309,430.

*To all whom it may concern:*

Be it known that I, GEORGE H. REYNOLDS, a citizen of the United States, and a resident of Spring Manor, Mansfield Depot, in the county of Tolland and State of Connecticut, have invented certain new and useful Improvements in Decorticating-Machines, of which the following is a specification.

This invention relates to a decorticating machine, and has for its object the production of means, with which stalks of flax and the like can be treated to break, split, and strip the woody fiber and shells thereof, without injury to the fiber.

The essential elements of the invention comprise a main crushing drum with flutes across its cylindrical surface, and a plurality of rolls with flutes across their cylindrical surfaces journaled adjacent to said main drum. A number of the flutes of the main drum are straddled by a number of the flutes of each roll. The drum and rolls are rotated in unison so that their flutes are maintained out of contact with each other, and thereby allow the introduction of the stalks of the flax or other material to be crushed and treated between them, without injury to the fiber in the stalks. In conjunction with the drum and rolls a feed conveyer charges the machine with the material to be treated, and a discharging conveyer carries the cleaned fiber away. A revolving brush cleans the material as it leaves the last roll, and forces it upon the said discharging conveyer.

In the accompanying drawings which exemplify the invention, Figure 1 is a partial front view of a decorticating machine with a portion of its frame broken away, and a partial section as on the line 1, 1, of Fig. 2, Fig. 2 shows a top plan view of Fig. 1, Fig. 3 is an enlarged end view of a portion of the main crushing drum, and one of the crushing rolls, Fig. 4 shows an enlarged partial vertical section through one of the bearing supports of the machine, as on the line 4, 4, of Fig. 2, Fig. 5 represents an enlarged partial section of the right hand end of Fig. 2, on the line 1, 1, and Fig. 6 is a top view of Fig. 5.

Frames 20 are fastened together by means of the bolts 21, and on each of them is carried a U shaped journal bearing support 22, which latter are secured in place with the studs 23. Journal bearings 24 extend from the frames 20 and support the drum shaft 25, on which is carried the driving pulley 26, the main crushing drum 27 with spokes 28, the spur gear 29 with the spokes 30 and the driver sprocket chain wheel 31. On the supports 22 are carried the spring journal bearings 32, from each of which latter extend the spindles 33, that are guided in openings or guides 34, extending radially through the said supports 22. A pocket 35 is formed beneath each opening 34, and a spring 36 surrounds each spindle 33 in the said pocket. A nut 37 with a sleeve 38 is carried on each of said spindles, the sleeve bearing against one end of the spring 36. The bearings 32 on the two supports 22 are located opposite each other in pairs, and each pair carries an axle 39, on which is fastened a pinion 40 that meshes with the spur gear 29. Each of the axles 39 also carries one of the crushing rolls 41.

The main crushing drum 27 extends across the width of the machine, and it has inclined or skew flutes 42 extending across its cylindrical surface, the inclinations of said flutes across the surface of the drum being preferably equal to the pitch thereof. The crushing rolls 41 also extend across the width of the machine and they have inclined or skew flutes 43, that straddle the flutes 42 of the large crushing drum. The rolls are fastened on their axles 39 to rotate in unison with the crushing drum 27, and avoid coming in contact with each other, thereby leaving sufficient clearance between their surfaces for the introduction of the material to be treated.

On the right hand end of the frames 20, is journaled a shaft 44 in the journal bearings 45, and from the supports 22 extend the journal brackets 46 for the shaft 47. Pulleys 48 and 49 on the shafts 44 and 47 respectively carry a feed conveyer 50. A guide 51 with the flattened ends 52 is bolted to the supports 22, with the studs 53.

On the left hand end of the frames 20 is journaled a shaft 54 in the journal brackets 55. Double journal brackets 56 adjacent to the supports 22 carry the shaft 57, and the brush shaft 58. Pulleys 59 and 69 are fastened on the shafts 57 and 54 respectively, and carry the discharging conveyer 60.

On the shaft 57 is secured a spur gear 61 which meshes with a somewhat smaller spur gear 62 fastened to the brush shaft 58. On the latter shaft there is carried a brush 63 the periphery of which is adjacent to the periphery of the crushing roll that is next adjacent to the conveyer 60.

On the left hand sides of the supports 22 is secured a guide 64 similar to the guide 51. The sprocket chain wheel 31 carries a sprocket chain 65 which meshes with the sprocket chain wheels 66 and 67, on the axles 47 and 57 respectively. A guide sheave 68 is journaled from one of the frames 20 for the sprocket chain 65, to keep it clear of the lower side of the sprocket chain wheel 31. The diameters of the two small sprocket chain wheels bear about the same relation to the diameter of the large sprocket chain wheel, as the relation between diameters of the crushing drum and the rolls.

To operate the invention the machine is driven by means of a belt rotating the pulley 26, which rotates the main shaft 25, and thereby the crushing drum 27, the spur gear 29, the pinions 40, the rolls 41 and the sprocket wheels. The directions of the rotations being indicated by the arrows, the cleaning brush 63 rotating in an opposite direction from the rolls 41. The stalks of flax are fed to the feed conveyer 50 and carried to the guide 51, by virtue of which they will be fed between the flutes of the crushing drum and the flutes of the rolls, and carried over the drum to the guide 64 which latter will lead the fiber of the stalks to the discharging conveyer 60. The stalks while traveling between the rolls and drum are bent forward and back, and are broken split and stripped from the fiber. They are finally brushed from the latter with the rotating cleaning brush 63, which revolving in an opposite direction from the rotation of the roll to which it is adjacent, thoroughly cleans the fiber of any broken shell or crushed wooden stalks, and prevents the said fiber winding itself around said drum and leads it to the guide 64. Should an over-charge of stalks be carried over the crushing drum, the spring bearings of the rolls allow the latter to rise, and there is thereby obtained more clearance for the passage of the material.

It will be noted that the rolls 41 are rotated by virtue of the pinions 40 all meshing with the spur gear 29, and the rolls therefore all rotate in the same directions, but the sides of a pair of the rolls that are adjacent to each other have rotations which are opposite each other as shown by the arrows 70 and 71. The peripheries of the rolls are close together, which together with the adjacent sides having opposite rotations prevents the material that is being treated from winding itself on the said rolls.

To obtain the proper rotations of the rolls with respect to the drum, that is to say so that they rotate in unison, the pitch diameter of the drum is made equal to the pitch diameter of the large spur gear, and the pitch diameters of the pinions and rolls are equal to each other.

The flutes of the drum and rolls are made skew to obtain a shearing effect in addition to the breaking effect, when the material is being fed between them.

Having described my invention, I claim:

1. In a decorticating machine the combination of a drum shaft, a crushing drum on the shaft, a spur gear on the shaft, axles parallel to the drum shaft, crushing rolls on the axles, pinions on the axles meshing with said spur gear, means to rotate the drum shaft, flutes on the rolls, flutes on the drum, the flutes on the drum straddling the flutes on the rolls, means to convey material to the drum and rolls, and a guide between said means and the said drum and rolls to direct the material between the drum and rolls.

2. In a decorticating machine the combination of a crushing drum, skew flutes on said drum, a plurality of rolls journaled adjacent to said drum, skew flutes on the rolls, means to maintain the flutes of the drum straddled with the flutes of the rolls, means to rotate the drum and rolls in unison, a charging conveyer leading to the machine, a guide between the conveyer and the drum, a discharging conveyer leading from the machine, a revolving cleaning brush adjacent to the last roll and over the discharging conveyer, and means to rotate the said brush in a direction opposite to that of the last roll.

3. In a decorticating machine the combination of a drum shaft, a crushing drum on the shaft, a spur gear on the shaft, axles parallel to the drum shaft, crushing rolls on the axles, pinions on the axles meshing with the spur gear, flutes on the crushing drum, flutes on the crushing rolls, the flutes on the crushing drum straddling the flutes on the rolls, a feed conveyer on one side of the crushing drum, a guide between the said drum and the said conveyer, a discharging conveyer on the other side of the crushing drum, and a guide between the drum and the latter conveyer.

4. In a decorticating machine the combination of a pair of frames, journal bearing supports on the frame, spring bearings carried on the said supports, axles supported in the spring bearings, a drum shaft journaled on the frames, a crushing drum carried on the drum shaft, a spur gear secured to the said drum shaft, pinions carried on axles in the spring bearings meshing with the spur gear, crushing rolls carried on the axles in the spring bearings, skew flutes on the crushing drum, skew flutes on the crushing rolls, a large sprocket chain wheel on the drum shaft, small sprocket chain wheels journaled on opposite sides of the large sprocket chain wheel, a sprocket chain engaging the three sprocket chain wheels, a feed conveyer on the machine and driven by the rotation of one of the axles of the small sprocket chain wheel, a discharging conveyer on the machine driven by the rotation of the axle of the other small sprocket chain wheel, guides between the conveyers and the crushing drum.

Signed at New York in the county of New York and State of New York this 30th day of March A. D. 1906.

GEORGE H. REYNOLDS.

Witnesses:
JAMES B. STEWART,
JOHN J. NEVIN.